Patented May 16, 1944

2,349,134

UNITED STATES PATENT OFFICE 2,349,134

ETHYL CELLULOSE MOLDING COMPOSITION

Russell R. Bradshaw, Midland, Mich., assignor to The Dow Chemical Company, Midland, Mich., a corporation of Michigan No Drawing. Application July 31, 1940, Serial No. 348,836

6 Claims. (Cl. 106—196)

This invention relates to molding compositions comprising ethyl cellulose as the plastic base.

In the compression or injection molding of ethyl cellulose and other cellulose derivative plastic compositions considerable difficulty is encountered because of the tendency of such compositions to adhere to the molding die. Ejection of the molded article from the die not only requires considerable force, but in some cases may damage the article to such an extent that it is entirely unsatisfactory. Furthermore, the surface of the molding lacks the gloss or lustre desired in molded plastic articles and is easily scratched or marred.

In order to overcome the above-stated difficulties, various lubricants have been suggested to be incorporated in the ethyl cellulose or applied to the face of the mold or die. The heretofore suggested lubricants have not proven satisfactory for at least one of two principal reasons. Some of them, such as carnauba wax and some other ester-type waxes, are miscible with the ethyl cellulose at molding temperatures and hence tend to become part of the internal composition rather than to remain on the surface in sufficient quantity to effect the desired lubrication or to improve the gloss of the molded article. Others of the proposed lubricants, such as paraffin wax, are incompatible with ethyl cellulose, except to a very limited extent, and tend to bloom on the surface of the molded article and to contribute a sticky or greasy feeling thereto. Still other lubricants previously used seem to react chemically with the ethyl cellulose at molding temperature, causing surface embrittlement.

The principal object of the present invention is to provide a method of lubricating an ethyl cellulose molding composition whereby said composition may be easily ejected from the mold, leaving the surface thereof unmarred by contact with the mold walls. Another object of the invention is the production of a smooth lustrous surface on molded ethyl cellulose plastics.

Other objects and advantages of the invention will become apparent during the course of the following description.

According to the present invention, the foregoing and related objects are attained by employing for molding ethyl cellulose plastics a lubricant composed of an incompatible mineral wax, e. g. paraffin, with which is incorporated a blending agent which is compatible with ethyl cellulose. The blending agent exerts a compatibilizing effect upon the paraffin wax in the lubricant and the ethyl cellulose in the molding composition, and serves to prevent blooming of incompatible lubricant constituents on the surface of the molded ethyl cellulose article, and the formation of a sticky or greasy film thereon.

Suitable blending agents are resins soluble in molten paraffin, examples of which are the unmodified phenolic resins ("pure" phenolics), hydrogenated rosin, rosin-modified alkyd resins (such as the rosin-maleic acid-glycerol resins), rosin modified phenolics, and the like. The term "phenolics," above employed with respect to various resins, is intended to designate the indicated types of phenol-formaldehyde resins. The term is so employed by Gardner, "Physical and Chemical Examination of Paints, Varnishes, Lacquers and Colors."

The blending agent may contain, in addition to the resinous component, a small proportion of a wax which is compatible with ethyl cellulose. Examples of such compatible waxes are carnauba wax, Opal wax (12-hydroxy stearin), or other ester-type wax.

The paraffin wax employed as the lubricant base should have a melting point above about 60° C., and commonly those paraffins melting above 100° C. are preferred. The proportions of paraffin wax and of resin-containing blending agent may vary between from about 10 to about 75 per cent by weight of the former to from about 90 to about 25 per cent of the latter. When the lubricant is added in amount of 1 to 6 per cent by weight of the ethyl cellulose molding composition, the molded articles are easily ejected from the mold without cleaving thereto and exhibit smooth, lustrous and mar-resistant surfaces conforming to the mold contour.

A convenient way of preparing the lubricant is to dissolve the paraffin in the fused or molten blending agent prior to adding the lubricating materials to the ethyl cellulose plastic. Improved dispersion of the lubricant in the molding plastic may be obtained if the basic lubricant is first saturated with ethyl cellulose while the wax-blending agent mixture is still molten, prior to incorporation of the lubricant in the molding plastic. If desired, the ethyl cellulose to be molded, desired plasticizer and pigment, if any, and the lubricant constituents, paraffin wax and blending agent, may be colloided together on a hot roll mill, cooled, ground to provide a molding "powder" and then molded. Other means of combining the various ingredients will be apparent to the skilled plastic molder.

The following example is given purely by way of illustration and not of limitation of the invention.

Example

A lubricant is prepared from 30 parts of Russian paraffin, melting point 150° C., 40 parts of 12-hydroxy stearin, and 30 parts of an unmodified or "pure" phenol-formaldehyde resin known to commerce as Superbeckacite 2000 and described by Gardner: Physical and Chemical Examination of Paints, Varnishes, Lacquers, and Colors; page 545 (1939), distributed from the Institute of Paint and Varnish Research, Washington, D. C. The paraffin and 12-hydroxy stearin are first melted together, and the compatible phenolic resin is then added. When all components are dissolved in the melt, there is added 10 parts by weight of ethyl cellulose to facilitate dispersion of the lubricant in the plastic. The liquid mass is homogenized by stirring, is filtered and cooled. A molding plastic is next prepared consisting of

|  | Parts by weight |
|---|---|
| Ethyl cellulose | 80 |
| Plasticizers: | |
| 1. Tri-(tertiary butyl phenyl) phosphate | 5 |
| 2. Butyl phthalyl butyl glycollate | 15 |
| Lubricant (as above prepared) | 4 |

The plastic mass is powdered and the molding powder used to feed an injection molding machine, from which the ethyl cellulose moldings release cleanly and exhibit a lustrous, smooth, mar-resistance surface. The lubricant does not bloom from the articles on long standing even at low temperatures and the articles are free from the common fault of "finger-printing."

Numerous other lubricants than the one described in the example fall within the scope of the invention. All may be used with ethyl cellulose plastics in amounts from about 1 to about 6 per cent of the weight of the plastic mass, and all give smooth, mar-resistant, and glossy surfaces when molded, the shaped articles separating freely from the mold.

I claim:

1. A molding lubricant for use with ethyl cellulose plastics consisting essentially of from about 10 to about 75 per cent by weight of paraffin wax and correspondingly from about 90 to about 25 per cent of a blending agent comprising a major proportion of a paraffin soluble resin and 12-hydroxy stearin.

2. A plastic molding composition comprising essentially ethyl cellulose and from 1 to 6 per cent of a mold-release lubricant consisting of from 10 to 75 per cent by weight of paraffin wax and from 90 to 25 per cent of a blending agent comprising a paraffin soluble resin.

3. A plastic molding composition comprising essentially ethyl cellulose and from 1 to 6 per cent of a mold-release lubricant consisting of from 10 to 75 per cent by weight of a paraffin wax and from 90 to 25 per cent of a blending agent consisting essentially of a paraffin soluble resin.

4. A plastic molding composition comprising essentially ethyl cellulose and from 1 to 6 per cent of a mold-release lubricant consisting of from 10 to 75 per cent by weight of a paraffin wax and from 90 to 25 per cent of a blending agent comprising a major proportion of a paraffin soluble resin and an ester type wax compatible with ethyl cellulose.

5. A plastic molding composition comprising essentially ethyl cellulose and from 1 to 6 per cent of a mold-release lubricant consisting of from 10 to 75 per cent by weight of a paraffin wax and from 90 to 25 per cent of a blending agent comprising a major proportion of a paraffin soluble resin and 12-hydroxy stearin.

6. A plastic molding composition comprising essentially ethyl cellulose of from 1 to 6 per cent of a mold-release lubricant consisting of from 10 to 75 per cent by weight of a parffin wax and from 90 to 25 per cent of a blending agent comprising a major proportion of a paraffin soluble resin and carnauba wax.

RUSSELL R. BRADSHAW.